United States Patent [19]

Kawano

[11] Patent Number: 4,579,321
[45] Date of Patent: Apr. 1, 1986

[54] POSITIONER OF COMPACT TYPE FOR WORKING POSITION IN SHEET OR PLATE MACHINING

[75] Inventor: Susumu Kawano, La Habra, Calif.
[73] Assignee: U.S. Amada Ltd., Buena Park, Calif.
[21] Appl. No.: 567,376
[22] Filed: Dec. 30, 1983
[51] Int. Cl.[4] .............................................. B23Q 3/18
[52] U.S. Cl. ...................................... 269/61; 269/73; 269/239
[58] Field of Search ................... 269/61, 73, 237, 238, 269/239; 83/410, 412, 413, 414, 415

[56] References Cited

U.S. PATENT DOCUMENTS 3,436,998  4/1969  Maceyka et al. ...................... 83/412
3,807,578  4/1974  Nelson ................................. 269/73
4,434,693  3/1984  Hosoi et al. .......................... 83/410

Primary Examiner—Frederick R. Schmidt
Assistant Examiner—Judy J. Hartman
Attorney, Agent, or Firm—Wigman & Cohen

[57] ABSTRACT

The present invention relates to a positioner for positioning a work piece such as a sheet or plate having first guide rails extending in the direction of the X-axis and second guide rails extending in the direction of the Y-axis, first and second carriages respectively movably supported on said first and second guide rails, clamp support members respectively supported by the first and second carriages and being movable in the direction perpendicular to the direction of the movement of the carriages, and clamping devices mounted to each clamp support member and adapted to clamp the work piece.

7 Claims, 2 Drawing Figures

POSITIONER OF COMPACT TYPE FOR WORKING POSITION IN SHEET OR PLATE MACHINING

BACKGROUND OF THE INVENTION

1. Field of the Invention

The present invention relates to means for automating an existing machine such as a driling machine, small punching press, etc., to work sheets or plates. In particular, it relates to a small-sized positioner for automatically positioning a blank work piece of a sheet or plate shape in perpendicular directions of X and Y axes by means of a controller such as a numerical controller.

2. Description of the Prior Art

In working machines for machining sheets or plates, such as a drilling machine or small-sized press, a small-sized positioner has been frequently employed as a supplementary attachment for automatically positioning stoppers in positioning with respect to X- and Y-axes through numerical control means, thereby automating an existing working machine. In such a conventional positioner, however, the stoppers in positioning with respect to X- and Y-axes are positioned and then an operator performs manually the positioning of the workpiece with respect to the directions of X- and Y-axes by abutting two perpendicular edges of the blank work piece against the positioning stoppers for the X- and Y-axes. Accordingly, the operator has to position each work piece in place for each working cycle so that there has arisen disadvantages that the working is inefficient and that the positioning accuracy is degraded by repeating the abutment of work piece against the positioning stoppers.

SUMMARY OF THE INVENTION

It is a primary object of the present invention to provide a compact positoner for a work piece which can automate an existing working machine easily.

It is another object of the present invention to provide a small-sized positioner for automatically positioning a blank work piece of a sheet or plate shape in perpendicular directions of X- and Y-axes.

In order to achieve such purposes in the present invention, two positioners having a substantially equal structure each for automatically positioning in one axial direction are arranged perpendicularly in the X- and Y-axes and two work clamp members each attached to each positioner are provided movably in the X- and Y-axis respectively, and biased in a manner that the work clamp members are separated away.

Other and further objects and advantages of the present invention will be apparent from the following description and accompanying drawings which, by way of illustration, show a preferred embodiment of the present invention and the principle thereof.

DESCRIPTION OF THE PREFERRED EMBODIMENT

Figure 1:
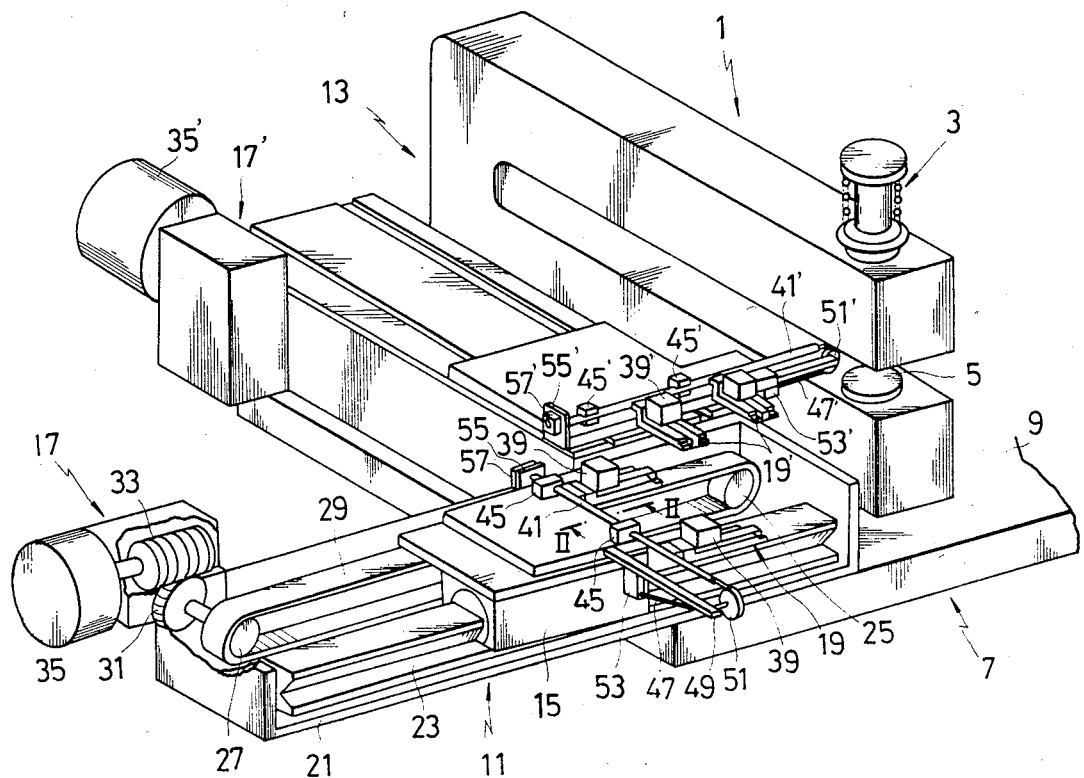
FIG. 1 is a perspective view of a positioner according to the present invention.

Referring to FIG. 1, generally designated by reference numeral 1 is a punch press illustrated as a blank working machine which is provided with a punch 3 for performing punching and a die 5 corresponding to the punch 3. Such blank working machines are not limited to the punch press, but include drilling machines for drilling a blank work piece W and tapping machines, etc.

A positioner 7 for positioning the work piece W in the X-axis and Y-axis perpendicular to the X-axis is provided in the vicinity of working position by punch 3 and die 5 in the punch press 1. The positioner 7 is secured on a bolster 9 and composed of a first positioner 11 with respect to the X-axis for moving and positioning the work piece W in the direction of the X axis and a second positioner 13 with respect to the Y-axis for moving and positioning the work piece W in the direction of the Y-axis.

As shown in FIG. 1, the positioner 11 with respect to the X-axis is composed essentially of a first carriage 15 movable along the X-axis, a driving means 17 for driving the first carriage 15 along the X-axis and a clamping means 19 for holding the work piece W along the X-axis.

More specifically, the bolster 9 is provided with a support frame 21 of a box type extending in the X-axis and the first carriage 15 is movably supported on guide rails 23 in the X-axis which is supported on the support frame 21. In addition, pulleys 25, 27 are rotatably supported near the opposite ends of the support frame 21. The first carriage 15 is connected appropriately with an endless belt 29, such as a timing belt running around the pulleys 25, 27. Hence, the first carriage 15 is moved in the direction of X-axis along the guide rails 23 by the endless belt 29 which is driven by turning the pulleys 25, 27.

The driving means 17 mounted in place on the support frame 21 is composed essentially of a worm-wheel 31 associated with the pulley 27, a worm-gear 33 engaged with the worm-wheel 31 and a driving motor 35 for rotating the worm-gear 33, such as a servomotor or pulse motor. The driving motor 35 for the driving device is driven by means of a suitable controller (not shown) such as a numeral controller.

As will be understood from the foregoing structure, when the driving motor 35 is turned forwardly or reversely under the control of the controller, the pulley 27 is rotated through the worm-gear 33 and worm-wheel 31, and the endless belt 29 is driven in an appropriate direction. Hence, it will be seen that the first carriage 15 is moved for positioning in the direction of the X-axis along the guide rails 23 by controlling the driving motor 35 by means of a suitable control means such as a numeral controller.

Figure 2:
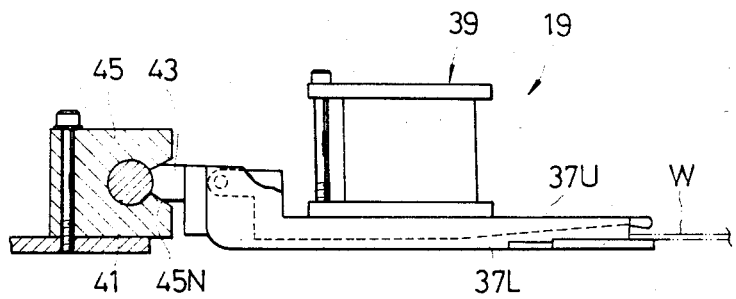
FIG. 2 is an enlarged sectional view taken along the line II—II in FIG. 1.

As seen from FIG. 2, the clamping device 19 is composed essentially of upper and lower clamping jaws 37U and 37L for the clamping work piece W and a cylinder means 39 for vertically driving the upper clamping jaw 37U to clamp and release the work piece W. The cylinder means 39 is supported on the lower clamping jaw 37L and its piston rod is connected to the upper clamping jaw 37U so that the vertical movement of the piston rod causes the vertical movement of the upper clamping jaw 37U.

Referring to FIGS. 1 and 2, supported on the first carriage 15 is a clamp support member 41 supporting the clamping means 19, which is movable in the direction of the Y-axis to move the clamping means 19 along the Y-axis perpendicular to the moving direction of the first carriage 15 along the X-axis. In other words, the clamp support member 41 is composed of a rod extending in the Y-axis and provided with the clamping device 19 integrally attached to one side of the rod through a spacer 43. The clamp support member 41 is supported slidably to a plurality of support blocks 45 each having a notched opening 45N for receiving the spacer 43. The support blocks 45 are attached on the first carriage 41 by means of appropriate connecting means, respectively. Connected to one end of the clamp support member 41 remote from the second positioner 13 is one end of an appropriate string member 47 such as a chain, belt or rope, the other end of which is connected to a winding device 53 through a pulley 51 rotatably supported by a bracket 49 secured fixedly to the first carriage 15. Although not shown in these figures in more detail, the winding device 53 is equipped with a reel which is rotatable for winding the string member 47 and with a spring or torsion spring for biasing the reel in the winding direction of string member 47, thereby placing the clamp support member 41 always under tension. The other end of the clamp support member 41 is integrally provided with a stopper member 57 which is adapted to abut against a stopper block 55 formed in the first carriage 15.

In the above-mentioned structure, the clamp support member 41 supporting a plurality of clamping means 19 is movable in the Y-axis perpendicular to the direction of the movement of the first carriage 15 along the X-axis and biased constantly in the direction apart from the second positioner 13 along the Y-axis by the action of the winding device 53.

The second positioner 13 has a structure symmetric with respect to the first positioner 11 and functions in the same manner. Therefore like numerals with dash refer to previously described elements having similar functions in the first positioner 11 and further description on the second positioner is omitted.

In operation, two perpendicular edges of a work piece W are clamped by means of the clamping means 19 in the first positioner 11 along the X-axis and the clamping device 19' in the second positioner 13 and the driving motors 35, 35' for driving the first positioner 11 and the second positioner 13 are driven under the control of the controller, thereby moving the first carriage 15 along the X-axis and the second carriage 15' along the Y-axis. When the first carriage 15 is moved along the X-axis as set forth above, the clamping means 19' and clamp support member 41' in the second positioner 13 are moved in the direction of the X-axis through the work piece W and when the second carriage 15' is moved in the direction of the Y-axis, the clamping means 19 and clamp support member 41 in the first positioner 11 are moved in the direction of the Y-axis. Namely, the first positioner 11 and the second positioner 13 contribute to move and position the work piece W in the X- and Y-axes with the work piece W clamped by the clamping means 19 and 19'.

Accordingly, when an existing working machine is to be automated, all the operation to be done by the operator is to clamp a work piece by the clamping means in the positioners and it is not required to position the work piece by abutting the work piece against the stoppers along the X- and Y-axes for each working cycle, thereby improving the working efficiency. In other words, one operator can operate concurrently a plurality of working machines.

Although a preferred form of the present invention has been illustrated and described, it should be understood that the device is capable of modification by one skilled in the art without departing from the principles of the invention. Accordingly, the scope of the invention is to be limited only by the claims appended hereto.

What is claimed is:

1. A positioner for positioning a workpiece at a working area, comprising:
    first guide rails placed close to the working area and extending in the direction of X-axis;
    second guide rails extending in the direction of Y-axis;
    first and second carriages respectively movably supported by said first and second guide rails;
    clamp support members disposed on each of said first and second carriages and being movable in a direction perpendicular to the direction of movement of the carriage on which it is disposed;
    clamping means each mounted to each clamp support member and adapted to clamp the workpiece;
    said clamp support members being biased in the direction perpendicular to the direction of movement of the carriage on which they are disposed;
    winding means for biasing the clamp support members; and
    a string member and pulley means for connecting each clamp support member to its respective winding means.

2. The positioner according to claim 1, wherein each clamp support member comprises a rod.

3. The positioner according to claim 2, further comprising a plurality of support blocks disposed on each carriage, each clamp support member being slidably disposed within the support blocks.

4. A positioner for a workpiece, comprising:
    first guide rails extending in a first direction;
    second guide rails extending in a second direction;
    first and second carriages respectively slidably disposed on the first and second guide rails;
    winding means and a pulley disposed on each carriage;
    a string member arranged on the pulley and connected to the winding means;
    support means connected to each string member and being movable in a direction perpendicular to the direction in which the carriage on which it is disposed is slidable; and
    clamp means mounted to each support means;
    said winding means applies tension to the support means in the direction of movement of the support means via the string member that interconnects the winding means and support means.

5. The positioner according to claim 4, further comprising support blocks mounted on each carriage.

6. The positioner according to claim 5, wherein the support means comprise cylindrical rods slidably disposed within the support blocks.

7. A positioning means for a work piece, comprising:
    a frame;
    first guide rails extending along the frame in an X-axis;
    second guide rails extending along the frame in a Y-axis;
    a first carriage slidably disposed on the first guide rails for movement in the X-axis;
    a second carriage slidably disposed on the second guide rails for movement in the Y-axis;
    support blocks mounted on the first and second carriages;

a spring-tensioned winding device and pulley means mounted on each of the first and second carriages;

a cylindrical rod-like support member slidably disposed on each carriage within the support blocks, each support member being interconnected to the winding device on its respective carriage by a string member running through the pulley means; and clamping means mounted on each support member;

wherein the clamping means and the support member mounted on the first carriage are slidable against spring-tension in the Y-axis, and the clamping means and the support member mounted on the second carriage are slidable against spring-tension in the X-axis.

* * * * *